S. BURWELL, Jr.
SINGLE HORSE PLOW FERTILIZER ATTACHMENT.
APPLICATION FILED MAY 28, 1909. RENEWED SEPT. 26, 1910.
989,114.
Patented Apr. 11, 1911.
2 SHEETS—SHEET 2.
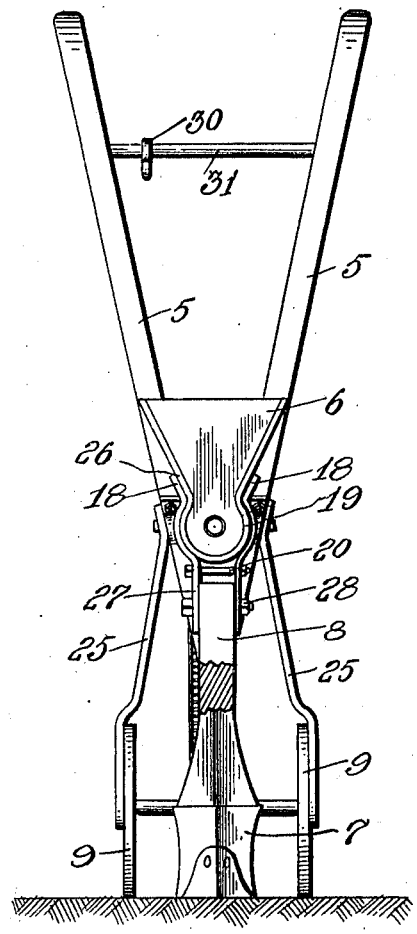
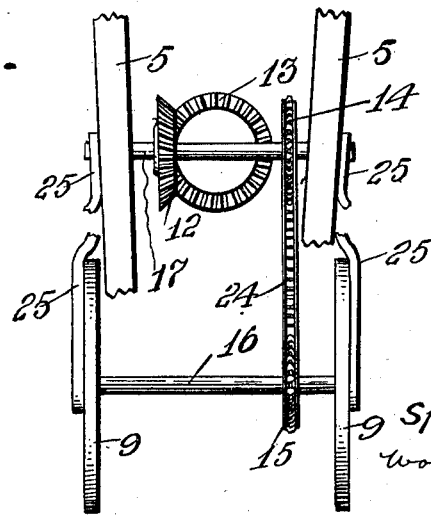
Witnesses
Moras Lessin
E. C. Chandlee
Inventor.
Spotswood Burwell Jr.
Woodward & Chandlee
Attorneys

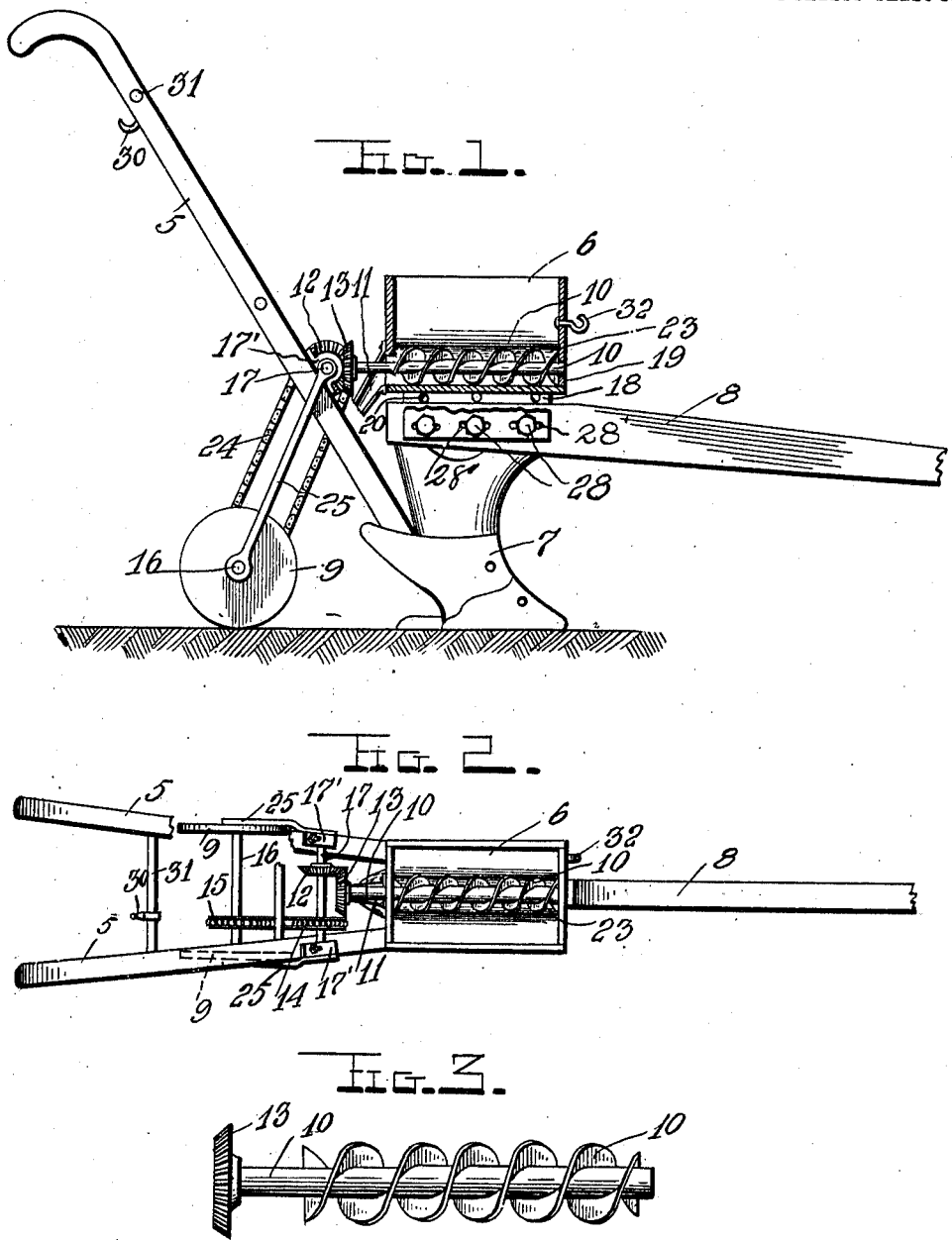

UNITED STATES PATENT OFFICE.

SPOTSWOOD BURWELL, JR., OF KITTRELL, NORTH CAROLINA.

SINGLE-HORSE-PLOW FERTILIZER ATTACHMENT.

989,114.  Specification of Letters Patent.  Patented Apr. 11, 1911.

Application filed May 28, 1909, Serial No. 498,823. Renewed September 26, 1910. Serial No. 583,802.

*To all whom it may concern:*

Be it known that I, SPOTSWOOD BURWELL, Jr., a citizen of the United States, residing at Kittrell, in the county of Vance and State of North Carolina, have invented certain new and useful Improvements in Single-Horse-Plow Fertilizer Attachments, of which the following is a specification.

My invention relates to attachments for plows, more particularly to attachments for hand plows, such as are adapted to fertilize the ground directly after the operation of turning the soil.

The object of this invention is to do away with the use of two separate agricultural implements now necessary in tilling and fertilizing the earth, and to embody both processes in one operation and machine.

It has for another object to supply an attachment so simple in its construction and adjustment that the average farmer can adjust and attach at will, without difficulty and requiring no special training.

With these and other objects in view, the present invention consists in the combination and arrangement of parts as will be hereinafter more fully described and particularly pointed out in the appended claim, it being understood that changes in the specific structure shown and described may be made within the scope of the claim without departing from the spirit of the invention.

In the drawings forming a part of this specification and in which like numerals of reference indicate similar parts in the several views, Figure 1 is a vertical longitudinal section, partly in elevation, taken centrally of Fig. 2. Fig. 2 is a top plan view of a plow provided with my attachment. Fig. 3 is an elevation of the spiral feeding mechanism. Fig. 4 is a front elevation Fig. 5 is a rear detail elevation of the operating shaft attached to the handles of the plow.

Referring more particularly to the drawings 8 indicates the beam or tongue of an ordinary hand plow, provided with the plow share 7 and the handles 5. A hopper 6, adapted to contain fertilizer is attached to the beam 8 by means of the special clamps 18, in such a position that the feeding mechanism is in coöperation with the operating mechanism. In a longitudinally extending, circular channel 23, formed in the base of said hopper is mounted the revoluble spiral feed 10, shown in detail in Fig. 3; so constructed, that upon its rotation the fertilizer will be gradually worked rearwardly to the spout 11, carried by the hopper and located in such a position that the fertilizer will be trailed or sprinkled in the furrow of the plow. On the rear end of the shaft 10 of this feed is the beveled gear 13, located so that it will mesh with a like gear 12 located on the shaft 17, operating between the handles 5. This shaft is carried in suitable journal brackets 17′ adapted to be secured to the front side of the usual plow handles. Adjacent one end of the shaft there is a sprocket gear 14, operated by a chain 24 extending to a similar gear 15 on the counter shaft 16, this being movably connected with the upper shaft 17 by means of the links 25, and carrying the driving guard disks which engage the ground to rotate the shaft 16 and in this manner the shaft 17 is likewise revolved setting in motion the spiral feed 10, through the medium of the meshed gears 12 and 13.

The clamps 18 are made in such a manner that they will snugly fit the contour of the hopper, feed channel, and beam, the oblique surface 26 fitting and being attached to the sloping face of the hopper, the circular parts 19 clamping the feed channel at the base of the hopper, and the straight portion 27 gripping the beam. Bolts 20 are coengaged with the opposed clamps just below the channel portion thus securely holding the hopper and feed between said clamps, which are held to the beam by the bolts 28, passing through the slots 28′ in the clamps and through the beam, in this manner allowing the longitudinal adjustment of the entire mechanism.

From the foregoing it will be understood that to attach my invention it is simply necessary to secure the shaft 17 and connection to the handles, then the portions 27 of the clamps are adjusted upon the beam and the hopper and contained mechanism adjusted between the clamps and moved rearwardly until the gears 12 and 13 are in mesh, after which the bolts 20 are tightened. In this way it is never necessary to remove the clamps of the hopper. The driving disk, when not in use, can be raised and fastened to the hook 30 on the upper cross brace 31 between the handles by means of a hook member 32, thus being out of the way and in a position for immediate use. It will be noted that the spout 11 is arranged to discharge between the disks, and these being of solid formation will prevent air currents from dispersing the particles of fertilizer.

In operation the disks 9 come in contact with the ground and in this way revolve the sprockets 15 and the chain 24, which in turn actuates the shaft 17 that through the medium of the meshed gears 12 and 13 sets in motion the spiral feed 10. This spiral feed gradually works the fertilizer in the hopper rearwardly to the spout 11, from which it falls to the ground, when it is partially covered up by the passage of the disks 9.

The construction of the hopper 6 is greatly simplified by reason of the fact that each end is formed of a plane head piece shaped as shown in Fig. 4, one end of which has a suitable bearing for the shaft of the feed member 10, and the rear one having a suitable outlet for the passage of fertilizer rearwardly from the hopper under action of the feed member; and the sides of the hopper being formed of one continuous piece of sheet metal bent to contact closely with the edges of the head members, whereby its manufacture is greatly simplified and cheapened, as well as the efficiency of the hopper greatly increased.

What is claimed is:

A device of the class described, comprising a hopper having a horizontal semi-cylindrical channel opening from its base and adapated for detachable engagement with a plow beam, a spiral feed member disposed revolubly in the channel and carrying a beveled gear at its rear end, journal brackets adapted for detachable engagement with a plow frame, a revoluble shaft carried therein, a beveled gear upon the shaft in mesh with the first gear, a sprocket on the shaft, pivoted link members pendent from the shaft, a revoluble shaft carried by the links, disks carried by the last mentioned shaft, and a spout communicating with the hopper and adapted to discharge material between the disks.

In testimony whereof I affix my signature, in presence of two witnesses.

SPOTSWOOD BURWELL, Jr.

Witnesses:
Silas Powell,
D. J. Cooper.

Copies of this patent may be obtained for five cents each, by addressing the "Commissioner of Patents, Washington, D. C."